No. 624,604. Patented May 9, 1899.
J. Q. ADAMS.
BELT COUPLING.
(Application filed July 5, 1898.)
(No Model.)

Witnesses
W. C. Corlies
Allan A. Murray

Inventor
John Quincy Adams
By Coburn, Hibben & McEhrny, Attys

THE NORRIS PETERS CO., PHOTO-LITHO., WASHINGTON, D. C.

UNITED STATES PATENT OFFICE.

JOHN QUINCY ADAMS, OF MARSEILLES, ILLINOIS.

BELT-COUPLING.

SPECIFICATION forming part of Letters Patent No. 624,604, dated May 9, 1899.

Application filed July 5, 1898. Serial No. 685,096. (No model.)

*To all whom it may concern:*

Be it known that I, JOHN QUINCY ADAMS, a citizen of the United States, residing at Marseilles, in the county of La Salle and State of Illinois, have invented certain new and useful Improvements in Belt-Couplings, of which the following is a specification.

My invention relates to couplings for belts and the like; and its object is to provide a simple and efficient means whereby a belt or the sections of a belt may be easily and readily coupled and uncoupled.

Figure 1:
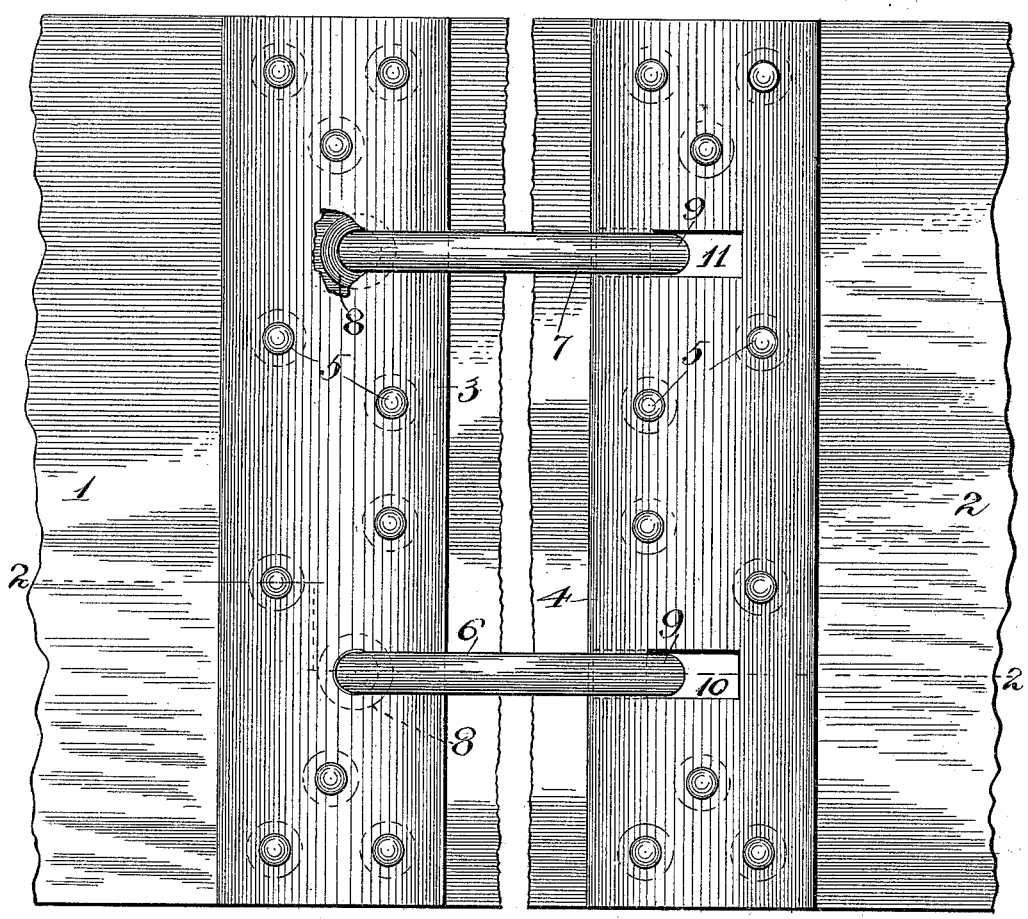
Figure 2:
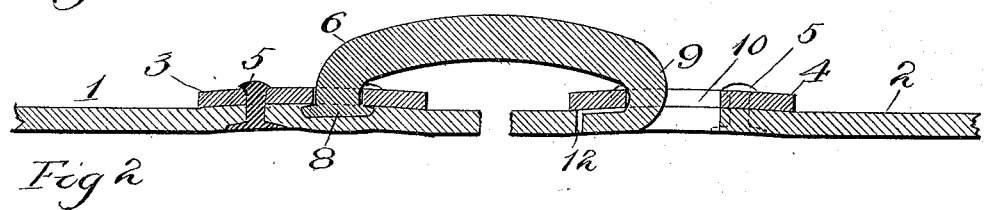

In the accompanying drawings, Figure 1 is a plan view of adjoining ends of a belt or of two sections of a belt, showing my coupling device in position; Fig. 2, a section on the irregular line 2 2 of Fig. 1 and showing the coupling in position; and Fig. 3, a view similar to that of Fig. 2, but showing the belt uncoupled.

In the drawings, 1 and 2 respectively represent the two free ends of a single belt or the meeting ends of adjoining sections of a belt, as the case may be. Upon one face of and substantially at the ends of the belt I provide transverse plates 3 and 4 of any suitable material, preferably of metal and preferably somewhat curved, as shown, and secure them thereto by means of rivets 5 or in any suitable or desired manner.

Figure 3:
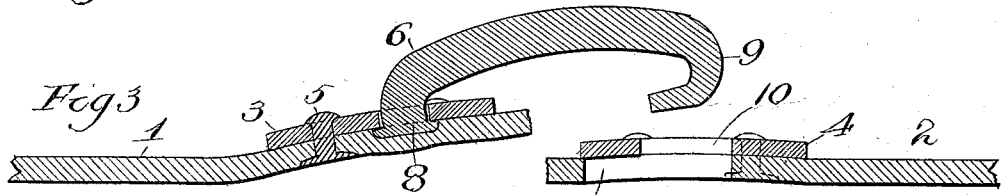

Connectors or hooks 6 and 7, preferably two in number, are riveted to the under side of the plate 3 between the plate and the belting material, as clearly shown in Figs. 2 and 3, where they are provided with riveted heads 8. These hooks are preferably, though not necessarily, made so as to be somewhat movable in the plate, and they extend forward from the end of the belting, where they are provided at their free ends with hooks proper, 9, which are received in holes or slots 10 and 11 in the adjoining plate 4, with whose belting 2 a coupling is to be made. These holes are of a size to permit the hooks to enter, whereupon the reëntrant portions of such hooks engage underneath the plate 4, a portion of the belting material adjacent to the hole being cut away, as shown at 12, to admit and accommodate the hook, as illustrated in Figs. 1 and 2.

By the use of my invention I am enabled to provide a simple and reliable form of belt-coupling which is easy of manipulation in coupling and uncoupling.

My invention has particular advantage and application for the conveyer-belts for corn-shelling machines, in which belts of different lengths are necessary during the operation. In such case the belt may be made in a plurality of sections coupled together by means of my device, and the number of these sections may be increased or diminished without the delay incident to lacing and other tedious and expensive methods. However, my invention also has application to belts for other purposes, and has relation to single belts in which the two ends are to be coupled together as well as to those belts made in sections.

Although I have described more or less precise forms and details of construction, I do not wish to be understood as limiting myself thereto, as I contemplate changes in form, the proportion of parts, and the substitution of equivalents as circumstances may suggest or render expedient and without departing from the spirit of my invention.

I claim—

1. A belt-coupling comprising a plate secured to one end of the belt, a connector secured at one end to the plate and having a hook-shaped end, and a second plate secured to the end of an adjoining belt and having a hole or slot to detachably receive the hook-shaped end of the connector, said connector extending across the joint at the belt ends on the same side of the belt as said plates.

2. A belt-coupling comprising a plate secured to one end of the belt, a connector movably secured at one end to the plate and having a hook-shaped free end extending beyond the end of the belt, and a second plate secured to the adjoining end of a belt to be coupled up and having a hole or slot to detachably receive the hook-shaped end of the connector, said connector extending across the joint at the belt ends on the same side of the belt as said plates.

3. A belt-coupling comprising a plate secured to one side of, and substantially at the end of, the belt, a connector or coupler pivoted at one end to the plate and having a hook-shaped end with a reëntrant portion, and a second plate secured to the side of, and substantially at the end of, a belt to be coupled up and provided with a hole or slot to receive the hook-shaped end of the connector, the belting being cut away adjacent to the hole to receive the reëntrant portion of the hook.

JOHN QUINCY ADAMS.

Witnesses:
  A. T. ADAMS,
  F. T. NEFF.